US012325279B2

(12) United States Patent
Schroeter et al.

(10) Patent No.: US 12,325,279 B2
(45) Date of Patent: Jun. 10, 2025

(54) LOCALIZED BRIGHTNESS DETECTION FOR A VEHICLE

(71) Applicant: Ford Global Technologies, LLC, Dearborn, MI (US)

(72) Inventors: Robert Schroeter, Livonia, MI (US); Mahmoud Yousef Ghannam, Canton, MI (US); Justin Miller, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 18/337,227

(22) Filed: Jun. 19, 2023

(65) Prior Publication Data

US 2024/0416718 A1    Dec. 19, 2024

(51) Int. Cl.
*B60H 1/00* (2006.01)
*B60Q 3/80* (2017.01)
*F21S 41/663* (2018.01)

(52) U.S. Cl.
CPC ......... *B60H 1/0075* (2013.01); *B60H 1/0073* (2019.05); *B60Q 3/80* (2017.02); *F21S 41/663* (2018.01); *G06T 2207/20081* (2013.01)

(58) Field of Classification Search
CPC .......... B60H 1/0073; B60H 1/00735; B60H 1/0075; B60Q 3/80; F21S 41/663; G06T 2207/20081
See application file for complete search history.

(56) References Cited

U.S. PATENT DOCUMENTS

| 8,493,446 | B2 | 7/2013 | Li et al. |
| 9,187,063 | B2 | 11/2015 | Hirai et al. |
| 10,486,586 | B1 | 11/2019 | Ghannam et al. |
| 10,562,379 | B2 | 2/2020 | Ghannam et al. |
| 10,635,116 | B2 | 4/2020 | Herman |
| 2015/0239395 | A1* | 8/2015 | Rogge ............... B60Q 3/80 315/77 |
| 2019/0068863 | A1* | 2/2019 | Boer ............... B64D 47/08 |
| 2022/0185063 | A1* | 6/2022 | Fragoso Iñiguez ............ B60H 1/00742 |

OTHER PUBLICATIONS

JP 2007 045300 (English translation) (Year: 2007).*

* cited by examiner

*Primary Examiner* — Jonathan Bradford
(74) *Attorney, Agent, or Firm* — Frank Lollo; Price Heneveld LLP

(57) ABSTRACT

A vehicle includes a compartment having a first space having a first environmental condition and a second space having a second environmental condition. At least one camera captures a first image of a first part of a region external to the vehicle and a second image of a second part of the region. The first part of the region aligns with the first space, and the second part of the region aligns with the second space. An environmental control system of the vehicle has at least one of lighting control and climate control. Control circuitry is configured to determine brightness conditions of the region based on the first image and the second image and control the environmental control system to adjust the environmental conditions based on the brightness conditions.

20 Claims, 6 Drawing Sheets

LOCALIZED BRIGHTNESS DETECTION FOR A VEHICLE

FIELD OF THE DISCLOSURE

The present disclosure generally relates to localized brightness detection for a vehicle and, more particularly, to climate and/or lighting control using imaging-based brightness tracking.

BACKGROUND OF THE DISCLOSURE

Conventional brightness detection may be achieved via a sun-load sensor inside the vehicle.

SUMMARY OF THE DISCLOSURE

According to a first aspect of the present disclosure, a vehicle includes a compartment that has a first space and a second space. The first space has a first environmental condition and the second space has a second environmental condition. The vehicle further includes at least one camera that captures at least one first image of a first part of a region external to the vehicle and that captures at least one second image of a second part of the region external to the vehicle. The first part of the region aligns with the first space and the second part of the region aligns with the second space. An environmental control system of the vehicle has at least one of lighting control and climate control for the vehicle. Control circuitry is in communication with the at least one camera and the environmental control system. The control circuitry is configured to determine a first brightness condition of the first part of the region based on the at least one first image. The control circuitry is further configured to determine a second brightness condition of the second part of the region based on the at least one second image. The control circuitry is further configured to control the environmental control system to adjust the first and the second environmental conditions based on the first and the second brightness conditions.

Embodiments of the first aspect of the present disclosure can include any one or a combination of the following features:
- adjustment to the first environmental condition is independent of the adjustment to the second environmental condition;
- the adjustments to the first and second environmental conditions are adjustments to a climate of the first and the second spaces, respectively;
- the first and the second brightness conditions each include an angle of brightness and a brightness level;
- the control circuitry is configured to process the first and the second brightness conditions in a spatial brightness model trained to determine a response for the environmental control system based on the first and second brightness conditions;
- the at least one camera includes a first camera has a vehicle-forward orientation and a second camera has a different orientation than the vehicle-forward orientation, and the first camera captures the at least one first image and the second camera captures the at least one second image;
- the control circuitry is configured to process a plurality of first images of the at least one first image captured sequentially by the first camera, detect a cluster of dark pixels increasing in size across the plurality of first images captured sequentially, and activate headlights of the vehicle in response to the increasing size of the cluster of dark pixels;
- the spatial brightness model maps the brightness conditions to the first and second spaces;
- the response includes an adjustment to at least one of interior lighting of the vehicle and climate control of the compartment;
- the control circuitry is configured to train the spatial brightness model based on user feedback to previous responses by the environmental control system; and
- further includes headlights, and wherein the response is to control the headlights of the vehicle.

According to a second aspect of the present disclosure, a vehicle includes a compartment has a first space and a second space. The first space has a first climate and the second space has a second climate. The vehicle further includes at least one camera that captures images of a first part of a region external to the vehicle aligned with the first space and a second part of the region external to the vehicle aligned with the second space. The vehicle further includes a climate control system. The vehicle further includes control circuitry in communication with the at least one camera and the climate control system. The control circuitry is configured to determine a first brightness condition of the first part of the region based on the images. The control circuitry is further configured to determine a second brightness condition of the second part of the region based on the images. The control circuitry is further configured to control the climate control system to adjust the first climate based on the first and the second brightness conditions. The control circuitry is further configured to control the climate control system to adjust the second climate based on the first and the second brightness conditions.

Embodiments of the second aspect of the present disclosure can include any one or a combination of the following features:
- adjustment to the first climate is independent of the adjustment to the second climate;
- the control circuitry is configured to process the first and second brightness conditions in a spatial brightness model trained to determine a response for the climate control system based on the first and the second brightness conditions;
- the spatial brightness model maps the first and second brightness conditions to the first and the second spaces;
- the control circuitry is configured to train the spatial brightness model based on user feedback to previous responses by the climate control system; and
- further includes a ventilation system, and wherein the response is to control the ventilation system.

According to a third aspect of the present disclosure, a vehicle includes a compartment has a first space and a second space. The first space has a first climate and the second space has a second climate. The vehicle further includes at least one camera that captures images of a first part of a region external to the vehicle aligned with the first space and a second part of the region external to the vehicle aligned with the second space. The vehicle further includes a climate control system. The vehicle further includes control circuitry in communication with the at least one camera and the climate control system. The control circuitry is configured to determine a first brightness condition of the first part of the region based on the images. The control circuitry is further configured to determine a second brightness condition of the second part of region based on the images. The control circuitry is further configured to process the first and the second brightness conditions in a spatial brightness model trained to determine a response for the climate control system based on the first and the second brightness conditions. The control circuitry is further configured to control the climate control system to adjust the first climate based on the response. The control circuitry is further configured to control the climate control system to adjust the second climate based on the response.

Embodiments of the second aspect of the present disclosure can include any one or a combination of the following features:
   adjustment to the first climate is independent of adjustment to the second climate; and
   the first and the second brightness conditions each include an angle of brightness and a brightness level.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
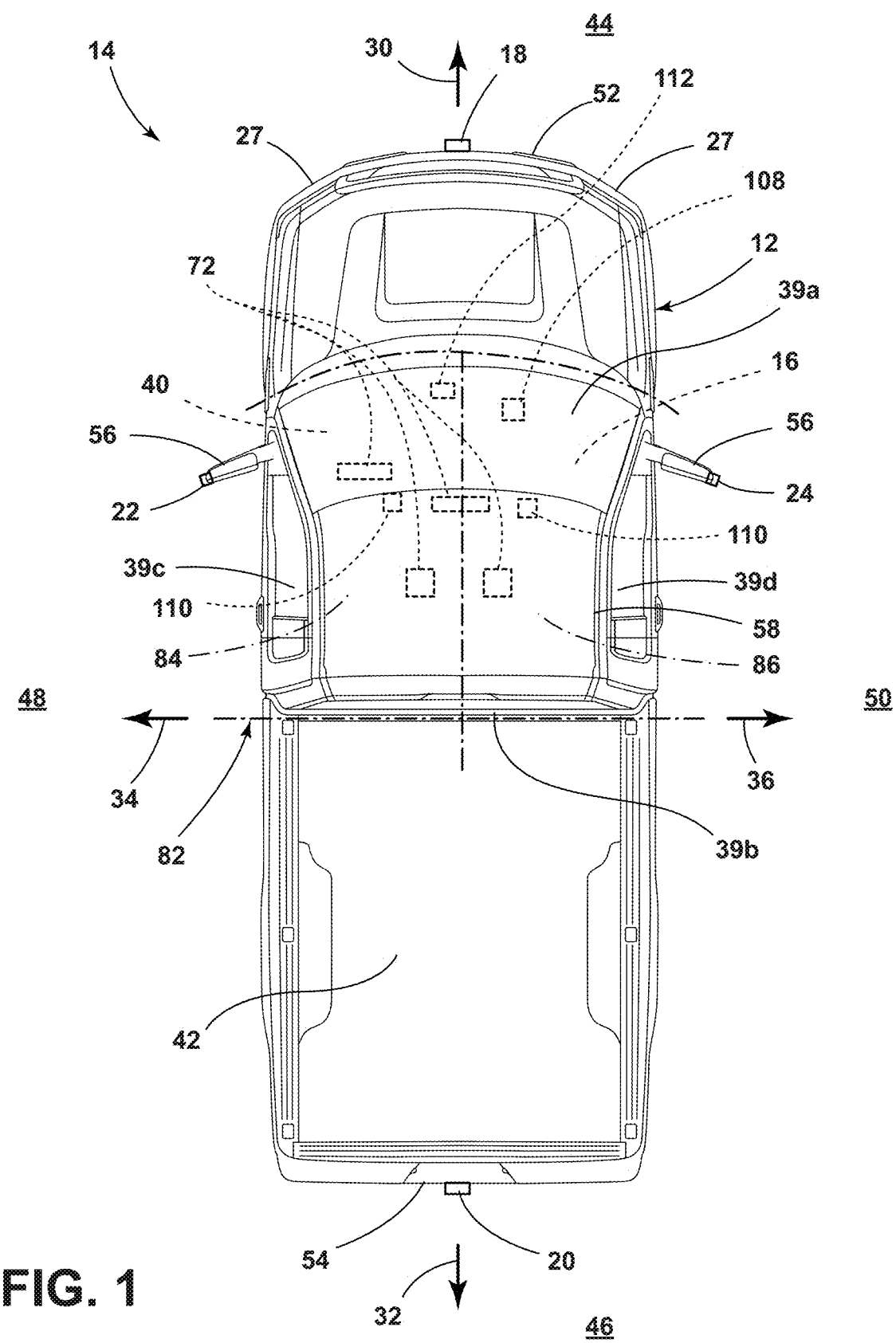
FIG. 1 is a top view of a vehicle incorporating a management system of the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to localized brightness detection for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1-7, reference numeral 10 generally designates a system for managing environmental control in a vehicle environment. The management system 10 is incorporated with a vehicle 12, such as an automobile, for detecting brightness conditions by monitoring lighting in a region external 14 to the vehicle 12. The system 10 may provide enhanced monitoring and detection techniques to detect sunlight or other sources of light illuminating the region external 14 to the vehicle 12 and or an interior 16 of the vehicle 12. Light sensing may be achieved via imaging devices 18, 20, 22, 24 inside or outside of the vehicle 12 that communicate image data for processing by the management system 10 to determine lighting conditions and control an environmental control system 26 of the vehicle 12. By employing imaging devices 18, 20, 22, 24 to detect the brightness conditions in lieu of or in addition to sun-load and/or ambient light sensing in the cabin 40, interference in brightness detection, such as objects on the windshield of the vehicle 12 (e.g., windshield wipers, ice, snow, leaves, other objects), may be restricted or otherwise limited. The control may include adjustments to exterior lighting, including headlights 27 (e.g., low-beam and/or high-beam), interior lighting (e.g., in-cabin lights 72, optical transmissivity of window of the vehicle 12, displays in the vehicle 12 (e.g., a heads-up display (HUD), control panel backlighting, etc.), and climate control (e.g., fan speed, heating, cooling, circulation modes, other aspects of the climate(s), etc.). In this way, the management system 10 utilizes images 28 of the region external 14 to the vehicle 12, in lieu of or in addition to other sensors, to detect lighting conditions and optimize climate and lighting responses for the vehicle 12. By utilizing the imaging devices 18, 20, 22, 24, other sensors dedicated to brightness detection may be omitted or employed as a redundancy check for determinations made by the management system 10.

In general, the management system 10 may provide for enhanced detection and response by adjusting, via control circuitry 38, sampling of the images 28 captured by the imaging devices 18, 20, 22, 24. Such adjustments are based on operation conditions of the vehicle 12 and/or the light levels or directions (e.g., angles, distributions, etc.). The management system 10 may also, or alternatively, provide for the enhanced detection and response by capturing images 28 of the region external 14 to the vehicle 12 from multiple angles (e.g., a front 30, a rear 32, and sides 34, 36 of the vehicle 12) and localizing the environmental response inside or outside of the vehicle 12 (e.g., adjusting interior lighting (e.g., lighting conditions) in one area of the vehicle 12 and not another area of the vehicle 12). The management system 10 may also incorporate an artificial intelligence algorithm that may train models based on feedback from a user or from other systems in the vehicle 12 or in surrounding vehicles. In this way, brightness thresholds may be finely tuned over time to cause the target response of the environmental control system 26 when desired (e.g., not turning on headlights 27 or turning on headlights 27 at appropriate timing).

Referring now more particularly to FIG. 1, the vehicle 12 is demonstrated as a truck having two compartments 40, 42. The two compartments 40, 42 include a cabin 40 and a bed 42 of the truck. The vehicle 12 includes a plurality of sensing devices for detecting conditions of the region external 14 to the vehicle 12. For example, the sensing devices include the imaging devices 18, 20, 22, 24, which may include cameras and/or infrared sensors (e.g., a rain sensor), as well as thermocouples (e.g., a temperature sensor 116), pressure sensors, humidity sensors, and the like. The vehicle 12 includes a plurality of windows, such as a left window 39a, a right window 39b, a back window 39c, and a front window 39d (e.g., a windshield).

The imaging devices 18, 20, 22, 24 may include a front imaging device 18, a rear imaging device 20, a right imaging device 24, and/or a left imaging device 22 each configured to capture images 28 of the region external 14 to the vehicle 12. For example, the front imaging device 18 has a field of view that captures a vehicle-forward view of the region external 14, the rear imaging device 20 has a field of view that captures a vehicle-rearward view of the region external 14, etc. In this way, each of the imaging devices 18, 20, 22, 24 may capture a different part of the region external 14 (e.g., a front part 44, a rear part 46, a left part 48, and a right part 50). In some examples, only the front imaging device 18 is used to capture the front part 44, though it is contemplated that any combination of the imaging devices may be employed to capture one or more parts of the region external 14 to the vehicle 12. In a non-limiting example, one rotating imaging device is employed to capture/stitch a panoramic view or a 360° view of the region external 14.

The location of the imaging devices 18, 20, 22, 24 is exemplary and non-limiting. For example, while illustrated at a front end 52 of the vehicle 12, the front imaging device 18 may be located in the interior 16 of the vehicle 12 behind the front window 39d. Similarly, while the rear imaging device 20 is depicted at a rear end 54 of the vehicle 12 (e.g., a rear parking assist imaging device) the rear imaging device 20 may be in any location configured to capture the rear part 46 of the region external 14 to the vehicle 12 (e.g., in the interior 16 and oriented toward the back window 39c). The side imaging devices 22, 24 are coupled with rear-view mirror assemblies 56 in the present example, though it is contemplated that other positions for the side imaging devices 22, 24 may be utilized (e.g., a top wall 58 of the vehicle 12, doors of the vehicle 12, any location with the imaging devices 18, 20, 22, 24 facing the side windows). By allowing for dynamic placement of the imaging devices 18, 20, 22, 24, the management system 10 may utilize pre-installed imaging devices 18, 20, 22, 24 to detect the brightness levels or light directions of the region external 14 to the vehicle 12. In this way, re-organization or physical relocation of imaging devices 18, 20, 22, 24 may be limited to allow software of the management system 10 to enhance brightness detection.

Figure 2:
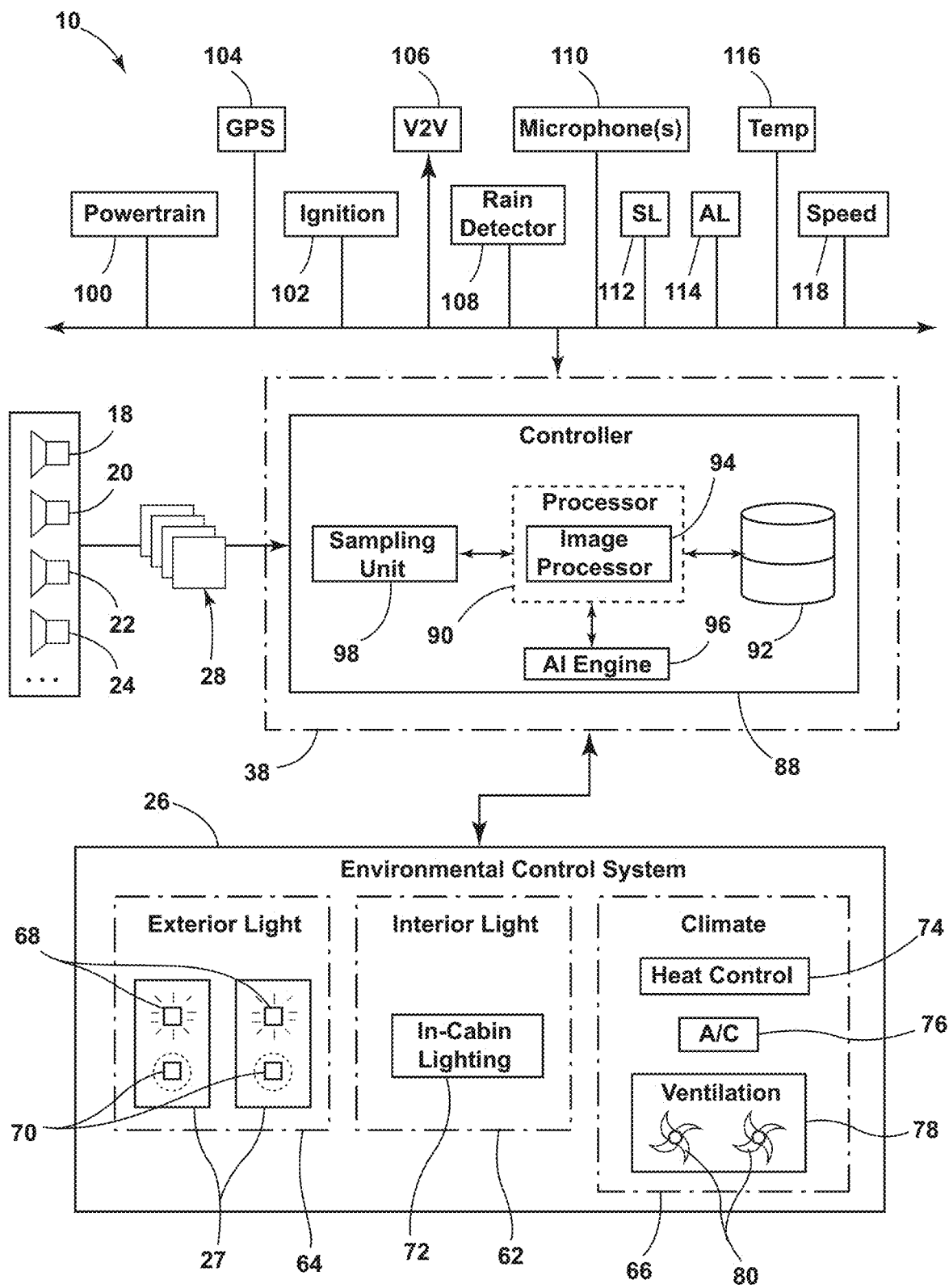
FIG. 2 is a block diagram of a management system according to one aspect of the present disclosure.

Referring now to FIGS. 1 and 2, the environmental control system 26 may include either or both of lighting control systems 62, 64 and a climate control system 66 to control environmental conditions in or around the vehicle 12. For example, the lighting control systems 62, 64 include an interior lighting system 62 and an exterior lighting system 64. The exterior lighting system 64 includes the headlights 27 of the vehicle 12, including high-beam light sources 68 and low-beam light sources 70. The interior lighting system 62 includes in-cabin lights 72, such as overhead illumination, control panel backlights, display illumination (e.g., heads-up display lighting), accent lights, dome lights, and other interior lighting mechanisms. The climate control system 66 includes a heat control unit 74, an air conditioning unit 76, and a ventilation control unit 78 that may be controlled individually or together to adjust the environmental conditions of the cabin 40. For example, the ventilation control unit 78 may include one or more fans 80 that may be controlled by the climate control system 66 to control airflow through the cabin 40. Fan speed and circulation modes (e.g., recirculation mode, vent mode) may be selectively controlled by the climate control system 66. Further, heating or cooling of the air may be adjusted by the climate control system 66 in response to signals communicated by the control circuitry 38 discussed in more detail below.

The environmental control system 26 may include or generate a spatial mapping 82 of the cabin 40 (FIG. 1) based on localized control over the environmental conditions of the cabin 40. For example, the spatial mapping 82 may outline a plurality of spaces 84, 86 in the cabin 40 that the climate control system 66 and/or the interior lighting system 62 can control individually. For example, a first space 84 corresponding to an operator position may have individual temperature and/or lighting control relative to a second space 86 corresponding to a non-operator passenger position. While demonstrated as two spaces 84, 86, it is contemplated that the number of spaces 84, 86 of the spatial mapping 82 may be higher than two to allow for more even lighting and climate control throughout the vehicle 12. For example, sunlight may illuminate, and therefore warm, one area of the vehicle 12 more than another, while a desired temperature for the entire cabin 40 is common to all areas in the vehicle 12. In such a case, the individual control provided by the management system 10 may enhance passenger comfort.

Referring more particularly now to FIG. 2, the control circuitry 38 of the management system 10 logically interposes the sensing devices of the vehicle 12 and the environmental control system 26 to process the image data and/or other sensor data to enhance timing of the response to the brightness detection. The control circuitry 38 may include a controller 88 having a processor 90 and a memory 92. The processor 90 includes one or more digital processing devices including, for example, a central processing unit (CPU) with one or more processing cores, a graphics processing unit (GPU), digital signal processors (DSPs), field programmable gate arrays (FPGAs), application specific integrated circuits (ASICs) and/or the like. In some configurations, multiple processors 90 devices are combined into a System on a Chip (SoC) configuration while in other confgurations the processors 90 devices are discrete components.

The memory 92 is formed from one or more data storage devices including, for example, magnetic or solid-state drives and random-access memory (RAM) devices that store digital data. The memory 92 holds stored program instructions, sensor data from the sensing device (e.g., image data, temperature data, humidity data, light section information, etc.), as well as image processing instructions. In operations that include the training of neural networks or machine-learning operations, the image processing module may additionally store training data for brightness detection.

In the present example, the processor 90 includes an image processor 94 that processes the image data from the imaging devices 18, 20, 22, 24 to detect brightness levels and/or light directions or angles based on patterns in the image data, such as clusters of bright pixels or clusters of dim or dark pixels in the images 28. The image processor 94 may perform various processing tasks on the image data including preprocessing, filtering, masking, cropping, and various enhancement techniques to enhance detection and efficiency. In addition to or as a subset of brightness detection, the image data may include color information, such as pixel values in a red-green-blue (RGB) array, that is processed by the image processor 94 to detect brightness. Examples of how the image processing may operate are further described in reference to FIGS. 3-5.

With continued reference to FIG. 2, the control circuitry 38 may include an artificial intelligence engine 96 that uses machine learning processes to generate trained neural networks to optimize the detection of brightness and the location of brightness relative to the various sides of the vehicle 12 (e.g., the front 30, the rear 32, the right and left sides 34, 36). For example, in addition or alternatively to including neural networks to scan the images 28 captured by the imaging devices 18, 20, 22, 24 to detect pixel patterns, the control circuitry 38 may have machine learning models trained to determine threshold brightness conditions that cause responses by the environmental control system 26. For example, the brightness conditions determined by the control circuitry 38 may be compared to a threshold brightness condition preprogrammed in the controller 88 or actively adjusted by the machine learning techniques. In some examples, manual feedback may be utilized to train the machine learning models to modify the threshold brightness conditions. Digital switches (e.g., a touchscreen) or physical buttons or switches (see FIG. 1) may be manipulated by a user, such as a passenger of the vehicle 12, to undo the response initiated by the control circuitry 38 at the environmental control system 26. In this way, the machine learning models may be trained via supervised learning to update the brightness condition thresholds.

Brightness conditions may include indications of light angles (e.g., sun or other light source low in the sky v. high in the sky) and intensities. For example, a mapping of the overall light distribution of the vehicle 12 may indicate brighter aspects on some of the sides of the vehicle 12 and darker aspects on other sides of the vehicle 12. Further, the location of light sources may be detected based on areas of the images 28 captured by the at least one imaging device 18, 20, 22, 24 having higher brightness levels. By detecting the location of the light sources (e.g., the sun, oncoming vehicle headlamps, streetlights, etc.), light angles may be determined by the control circuitry 38 to further refine the response by the system 10.

Still referring to FIG. 2, a sampling unit 98 may be in communication or otherwise included with the processor 90 to allow the control circuitry 38 to adjust a sampling rate of the images 28 captured by one or more of the imaging devices 18, 20, 22, 24. The sampling unit 98 may passively or actively operate with the imaging devices 18, 20, 22, 24 by either selectively reading from the image data or actively initiating the image capture process. In either example, the number of frames of the region external 14 to the vehicle 12 analyzed by the image processor 94 may be controlled by the control circuitry 38 via the sampling unit 98.

With continued reference to FIG. 2, the control circuitry 38 may be in communication with auxiliary systems and sensing devices other than imaging devices 18, 20, 22, 24 to provide redundancy and/or logical checks of the brightness conditions. For example, a powertrain 100 of the vehicle 12, an ignition system 102, a location system 104, such as a global positioning system (GPS), a vehicle-to-vehicle communication system (V2V system) 106, a rain detection system 108, at least one microphone 110, a sun-load sensor 112, an ambient light sensor 114, a temperature sensor 116, and/or any other sensing device or vehicle system may be communicatively coupled with the control circuitry 38. In one example, a speed sensor 118 is in communication with the control circuitry 38 to allow the control circuitry 38 to modify detection techniques based on the speed of the vehicle 12. The data from these auxiliary systems and sensing devices may be used by the control circuitry 38 to check or support the determination of the brightness based on the images 28, as will be further described below.

Figure 3:
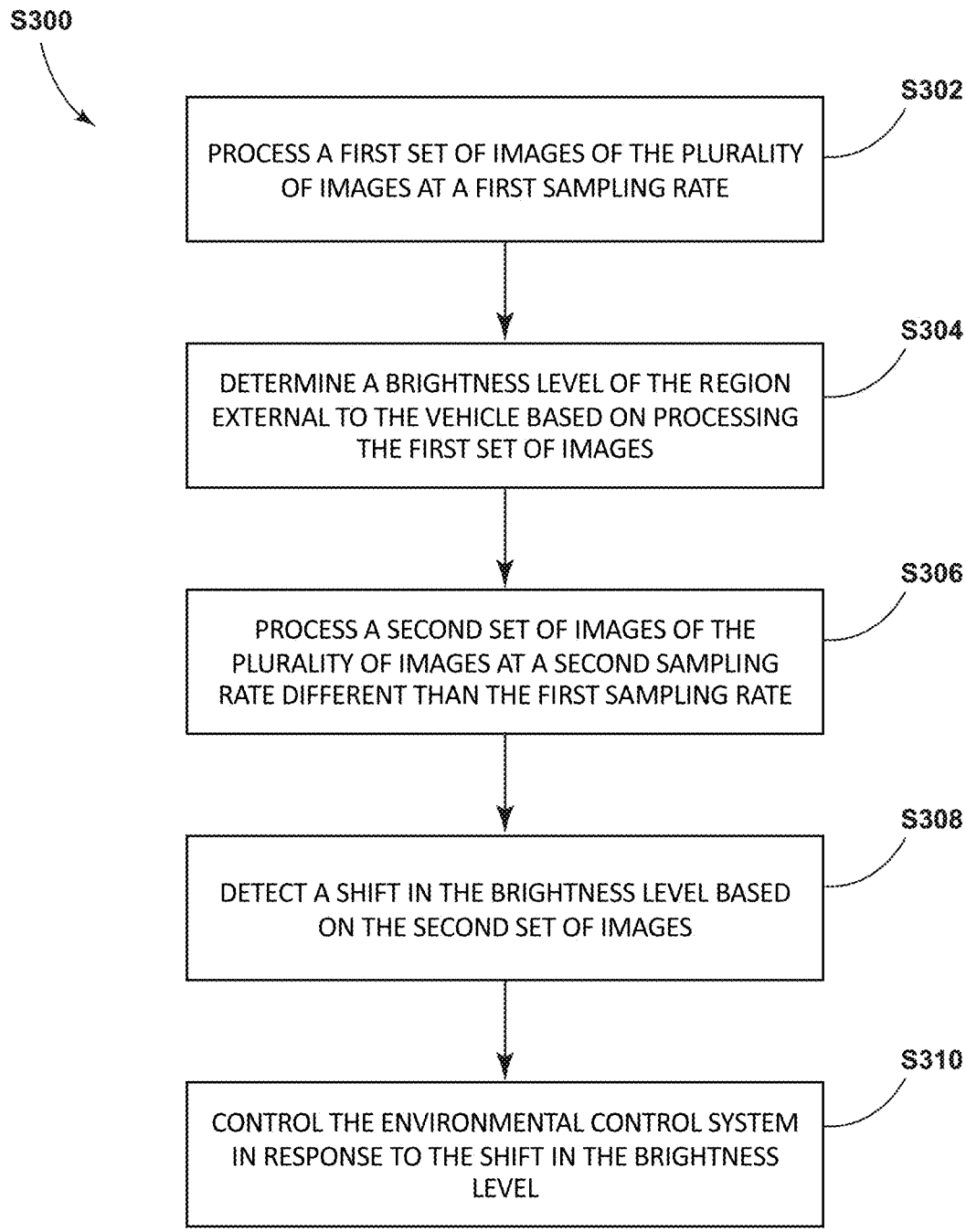
FIG. 3 is a flow diagram of a process for adjustment of an environmental control system of a vehicle by a management system of the present disclosure.
Figure 4:
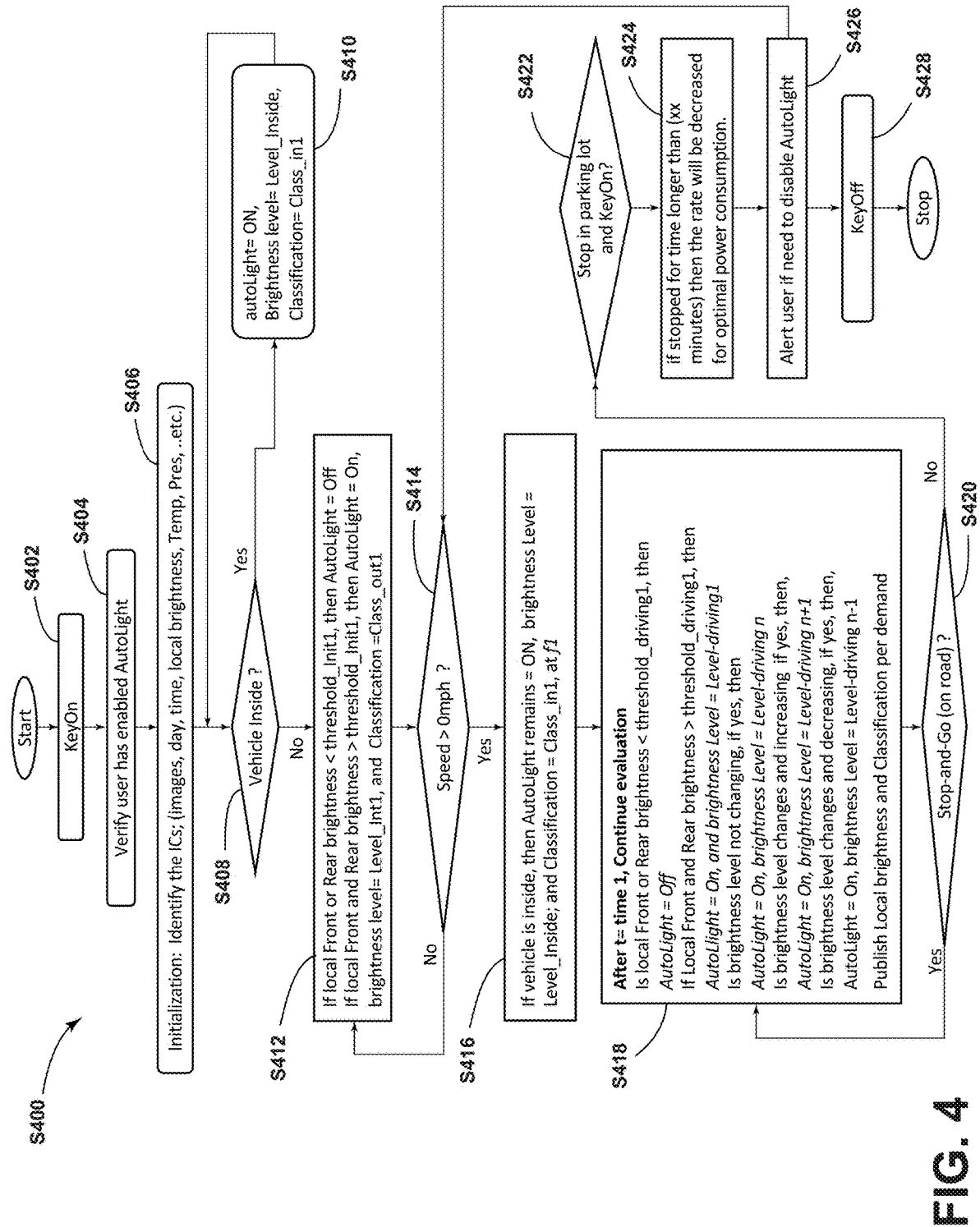
FIG. 4 is a flow diagram of a process of managing passive and active modes for monitoring a region external to the vehicle using a management system according to one aspect of the present disclosure.
Figure 5:
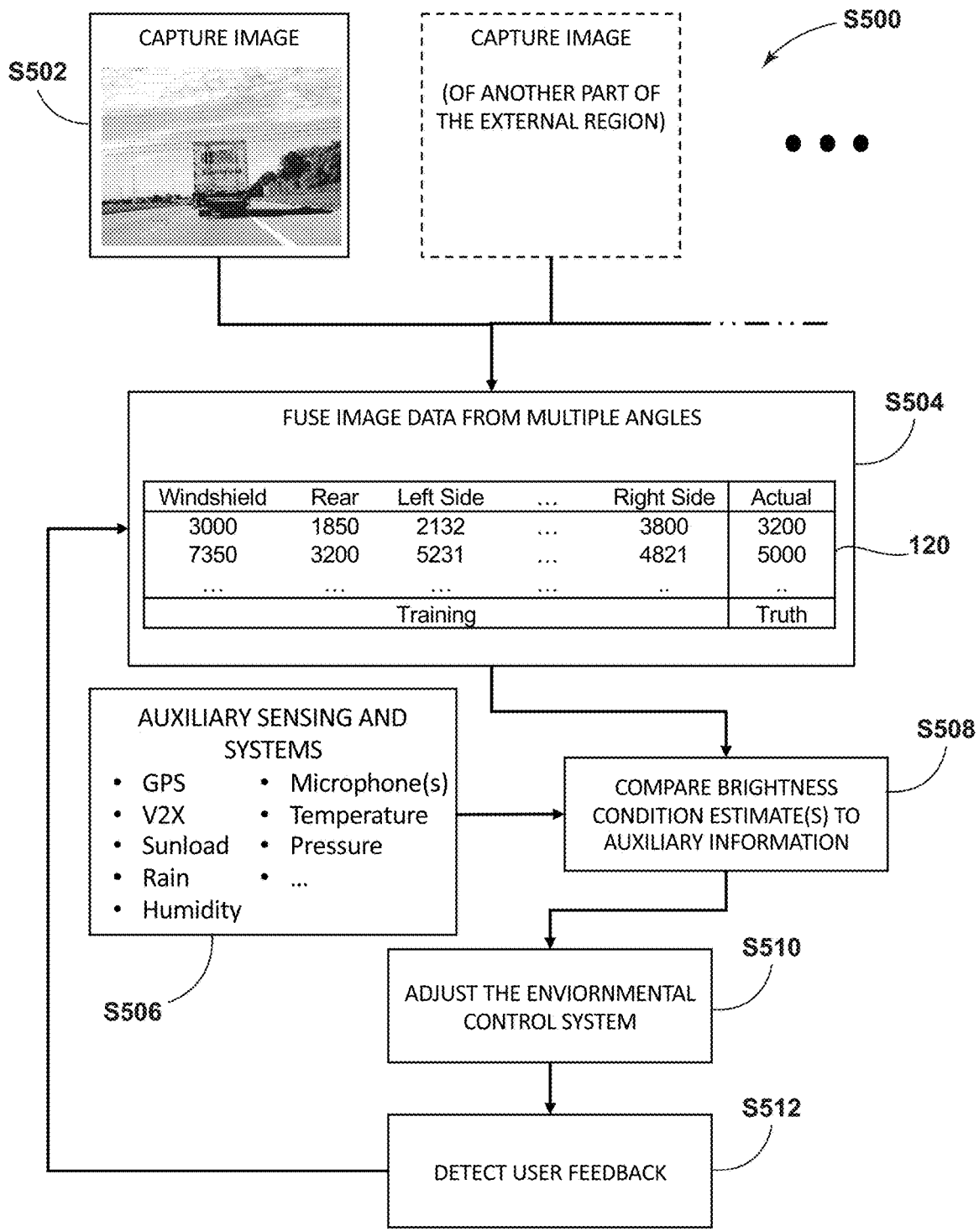
FIG. 5 is a flow diagram of a process for detecting brightness conditions and employing a spatial brightness model to control an environmental control system for the vehicle.

Referring now to FIGS. 3-5, exemplary processes S300, S400 by which the management system 10 may determine the adjustment to the environmental control system 26 using the hardware of FIG. 2 will now be described. With particular reference to FIG. 3, a process S300 for controlling the environmental control system 26 includes processing a first set of images of a plurality of images 28 captured by at least one of the imaging devices 18, 20, 22, 24 of the region external 14 to the vehicle 12 at a first sampling rate at step S302. For example, at least one imaging device 18, 20, 22, 24 (e.g., one or more of the imaging devices 18, 20, 22, 24) may be employed to capture images 28 of the region external 14 to the vehicle 12 and the sampling unit 98 may be controlled by the processor 90 to sample the images 28 at a relatively fast rate. In some examples, the first sampling rate is between 10 and 60 frames per second (fps). In some examples, the first sampling rate is approximately 30 to 60 fps.

The process S300 further includes determining the brightness level of the region external 14 to the vehicle 12 based on processing the first set of images at S304. In one example, the first sampling rate is applied during an initialization mode in which one or more of the imaging devices 18, 20, 22, 24 captures initial conditions, including the brightness conditions, temperature, humidity, etc. As will be further described herein, the initialization mode may further classify the location of the vehicle 12 as "inside" or "outside" based on the surroundings detected based on the image data and provide a base brightness condition threshold by which to compare changes.

Once the brightness level of the external region 14 is determined, the control circuitry 38 may process a second set of images at a second sampling rate different than the first sampling rate at S306. The second images may be captured at this time. In this way, the second set of images may temporally follow the first set of images. For example, following the initialization mode, the control circuitry 38 may enter an active mode in which the sampling rate of the sampling module is actively controlled based on one or more conditions of the region external 14 to the vehicle 12 or operational conditions of the vehicle 12. For example, based on communication with the powertrain 100 or a speed sensor 118, the control circuitry 38 may receive indication that the vehicle 12 is moving (e.g., in drive, reverse, etc.) as opposed to in park or not moving. In response to movement of the vehicle 12 and/or termination of the initialization mode, the control circuitry 38 may decrease the sampling rate to the second sampling rate. Thus, following the initialization mode, which may provide location data of the vehicle 12 and/or other information to provide a confidence value of the brightness level of the region external 14 to the vehicle 12, the active mode may be operational.

In some examples, the control circuitry 38 may adjust to the second sampling rate in response to detecting a rate of change of the brightness level. In this example, the first set of images refers to images 28 captured during the active mode. When the rate of change of the brightness level increases beyond a rate of change limit, the control circuitry 38 adjusts to the second sampling rate to provide a more stable prediction of the brightness conditions. For example, if the vehicle 12 is moving along a road at night and streetlights periodically illuminate the street, the brightness level, if detected at 60 fps, may adjust between a low level and a very high level based on when the vehicle 12 is far from or near a streetlight. In response to this rate of change of the brightness level, the control circuitry 38 may reduce the sampling rate to provide a more even estimation of the brightness for the purposes of initiating the response of the environmental control system 26. In some examples, the second frame rate may be between 1 and 20 fps. In some examples, the second frame rate is between 1 and 10 fps.

With continued reference to FIG. 3, at step S308, the control circuitry 38 detects a shift in the brightness level based on the second set of images. For example, the shift may be an actual change in the brightness conditions that suggests a response by the environmental control system 26. In the example of driving at night in streets partially illuminated by streetlights, the shift may refer to a more even, or average, brightness change that may or may not cause a response of activating the headlights 27 of the vehicle 12. In this way, the shift is an indication to the control system to adjust the environmental control system 26.

The control circuitry 38 may then control the environmental control system 26 in response to the shift in the brightness level at step S310. Accordingly, based on the detected shift in the brightness level, the environmental control system 26 may turn on headlights 27, increase brightness of an instrument panel or the HUD in the cabin 40, adjust a temperature of the cabin 40 via control of the ventilation, or adjust any other parameter of the environmental conditions. Such adjustments may be to the individual spaces 84, 86 in the vehicle 12 or to the entire cabin 40 of the vehicle 12.

Referring now to FIG. 4, another process S400, which may be a sub-process of the first process S300 or separate from the first process S300, provides for shifting between the initialization and active modes to control the headlights 27 of the vehicle 12. The process S400 includes the control circuitry 38 detecting ignition of the vehicle 12 via the ignition system 102 at step S402. At S404, an auto-light mode is detected by the control circuitry 38. The auto-light mode may refer to an operational mode for the headlights 27 that allows the management system 10 to control whether the headlights 27 are activated or not based on the brightness conditions. Once an engine of the vehicle 12 is on and auto-light mode is enabled, initial conditions of the interior 16 and/or region external 14 to the vehicle 12 are determined by the control circuitry 38 at step S406.

Based on the initial conditions, the control circuitry 38 may classify the region external 14 to the vehicle 12 as "inside" or "outside" at step S408. In this way, the control circuitry 38 may assign an initialization value to the brightness conditions within a structure (e.g., under a carport or garage, in a tunnel etc.) and further energize the headlights 27 based on classification of the vehicle 12 being inside at step S410. If the vehicle 12 is "outside" (e.g., not covered by a structure), the control circuitry 38 classifies and assigns an initialization value to the brightness conditions when the vehicle 12 is outside at step S412. In the present example, two imagers (e.g., the front imaging device 18 and the rear imaging device 20) scan the region external 14 to the vehicle 12 to capture images 28 indicating the brightness conditions in vehicle-forward and vehicle-rearward directions. The fields of view of these imaging devices 18, 20, 22, 24 may also cover at least a portion of the side view from the vehicle 12. In the present example, if either the front or the rear brightness conditions are below the brightness threshold, the control circuitry 38 may de-energize the headlights 27 in response. In other examples, the control circuitry 38 may amalgamate or merge the front and rear brightness conditions together to determine an overall brightness level of the region external 14.

As the vehicle 12 idles, the brightness conditions are continuously processed. Once the speed of the vehicle 12 is non-zero (step S414), the sampling rate of the sampling module is set to the first sampling rate to track brightness conditions during maneuvering (e.g., driving) of the vehicle 12 at step S416. During operation of the vehicle 12, the control circuitry 38 actively monitors the brightness conditions to control the activation or deactivation of the headlights 27 at step S418.

During step 418, the machine learning models may be applied and trained based on automatic changes to the headlights 27 effectuated by the control circuitry 38 and response of the user. For example, manually turning headlights ON while the processor 90 is computing the brightness levels may change the control circuitry 38 to default to energizing the headlights 27 in future events in which the brightness conditions are similar or identical. Using the images 28 to detect the headlights of other vehicles may also be used to train the machine learning models. For example, a pair of clusters of pixels may be detected in the images 28, and the control circuitry 38 may determine that other vehicles have headlights 27 on in response. The control circuitry 38 may then activate the headlights 27.

In order to enhance power management, the control circuitry 38 further dynamically adjusts the sampling rate based on whether the vehicle 12 is parked, not moving, or otherwise still for an extended time and, upon such determination, decreases the sampling rate. For example, at step S420, the control circuitry 38 classifies stopping of the vehicle 12 as a "stop-and-go" condition or a "full stop" condition (step S422). In the stop-and-go condition, such as in traffic or stopped for a relatively short duration (seconds or minutes), the control circuitry 38 continues to sample at the first sampling rate. If the vehicle 12 is stopped for more than a relatively short duration (e.g., at least 3 minutes, at least 5 minutes, at least 10 minutes, etc.), the control circuitry 38 may adjust to a lower sampling rate to save power at step S424. Because the vehicle 12 is not moving, the brightness conditions may be less actively tracked (e.g., low sampling rates). In some examples, the gear status of the powertrain 100 being park and/or a parking brake for the vehicle 12 being activated may also or alternatively provide adjustment to the lower sampling rate.

At step S426, the user may be notified via a human-machine interface (HMI), such as the HUD or touchscreen panel, that the headlights 27 should be disabled. For example, the user may be notified to request the user to disable the headlights 27. If the vehicle 12 begins to move again (step S414), the process may repeat steps S416-S420. Otherwise, once the engine is shut down as detected by the control circuitry 38 at step S428, the process ends.

The adjustment of frame sampling by the control circuitry 38 described above may provide for an enhanced computational and/or electrical power savings. For example, a reduced sampling rate may result in less image data to be processed and therefore allow for other vehicle monitoring systems to process data under a common power and/or computational level.

Referring now to FIG. 5, a process S500 for extracting brightness conditions from the images 28 captured from one or more imaging devices 18, 20, 22, 24 and generating/training a spatial brightness model 120 may be used independently or in conjunction with the sampling rate adjustment processes S300, S400 previously described. The process S500 includes capturing images 28 from one or more angles at S502. For example, while the image in step S502 is of a field of view in a vehicle-forward direction, the vehicle-rearward direction and/or vehicle-lateral directions may be captured.

The images 28 and metadata corresponding to the images 28 (e.g., exposure time, brightness, saturation, etc.) are then communicated to the control circuitry 38, which may amalgamate or fuse the image data and metadata from multiple imaging devices 18, 20, 22, 24 to render brightness conditions of one or more of the parts 44, 46, 48, 50 of the region external 14 to the vehicle 12 at step S504. For example, the control circuitry 38 may process pixel values, such as red, green, and blue color values, to estimate the brightness conditions. The image processor 94 may determine lux values for the images 28 and amalgamate the lux values. For example, the table illustrated in FIG. 5 demonstrates exemplary lux values for localized areas of the vehicle 12 (e.g., the spaces 84, 86 of the cabin 40).

At step S506, the brightness condition(s) are compared to information gathered from the auxiliary sensors and systems in communication with the control circuitry 38 as presented in FIG. 2. For example, if the sun-load sensor 112 is present, the brightness condition(s) may be compared to sun-load information generated via a photodiode or other device in the vehicle 12 to serve as a logical check against the brightness condition. For example, an ON/OFF signal from the sun-load sensor 112 or ambient light sensor 114 may be compared to the brightness condition estimated by the control circuitry 38. If the brightness condition estimate is not aligned with or disagrees with the signal from the auxiliary sensing devices, the brightness condition estimates may be modified to lower or higher based on the disagreement. For example, if the sun-load sensor 112 produces a very high light (lux) reading, and the brightness condition estimate is average, the control circuitry 38 may adjust the estimate higher. It is contemplated that the auxiliary sensing devices may be omitted in various examples and use only one or more of the imaging devices 18, 20, 22, 24 to determine the brightness conditions.

At step S508, the control circuitry 38 may compare the brightness condition estimate(s) to threshold data to determine whether a response from the environmental control system 26 is requested and, if so, what that response may be. At step S510, the control circuitry 38 may communicate an instruction to adjust the environmental control system 26 based on the brightness conditions exceeding the threshold data. For example, if the brightness condition estimate is high and the headlights 27 are off, no adjustment may be initiated for the exterior lighting system 64. However, the climate control system 66 may adjust temperature controls within the cabin 40 to cool the cabin 40, and/or the interior lighting system 62 may adjust lighting in the cabin 40 to reduce interior lighting. The responses may be localized to the spaces 84, 86 aligned with the sides 34, 36 of the vehicle 12 having higher lux readings.

By way of example, the table in FIG. 5 demonstrates varying lux values corresponding to different parts of the vehicle 12, such as the front 30, rear 32, and sides 34, 36. The first space 84 may align with the left front and the second space 86 may align with the right front of the cabin 40. Because the left side 34 has lower lux values, the control circuitry 38 may control the interior lighting to provide more illumination of left side 34 of the interior 16 and less illumination of the right side 36 of the interior 16. Additionally, or alternatively, if both the first and second spaces 84, 86 are set to maintain a common temperature by the climate control system 66, the climate control system 66 may increase fan speed for greater cooling of the right side 36 than the left to account for greater heat (e.g., from sunlight) on the right side 36 than the left side 34. It is contemplated that this example is non-limiting. In general, by correlating the brightness conditions with areas of the cabin 40, the interior lighting and climate of the cabin 40 may be individually controlled by the control circuitry 38 with precision.

The table in FIG. 5 further demonstrates the generation and training of the spatial brightness model 120. For example, the control circuitry 38 may compare the various measurements to a brightness flag. The brightness flag may be stored in memory 92 as a pre-defined value generated based on using a ground truth light sensor to compare to tested measurements of lux values from different parts of the region external 14 to the vehicle 12. For example, the spatial brightness model 120 may determine a heavier weight for the lux values of images 28 captured by the front imaging device 18 relative to the lux values of images 28 captured by the rear imaging device 20. Further, the brightness flag may be dynamic and may change based on user feedback. At step S512, the process detects user feedback responsive to the adjustment to the environmental control system 26. For example, if the temperature controls were modified in response to the brightness conditions, the user may manually engage controls of the climate control system 66 to undo the change. Based on this feedback, the spatial brightness model 120, the brightness flag, and the threshold information may be updated. In another example, the headlights 27 are automatically activated in response to the brightness level being below a threshold brightness level, and the user may manually adjust the headlights 27 to keep the headlights 27 on. Such adjustments may provide user feedback to the control circuitry 38 to update the trained models and threshold data.

Figure 6:
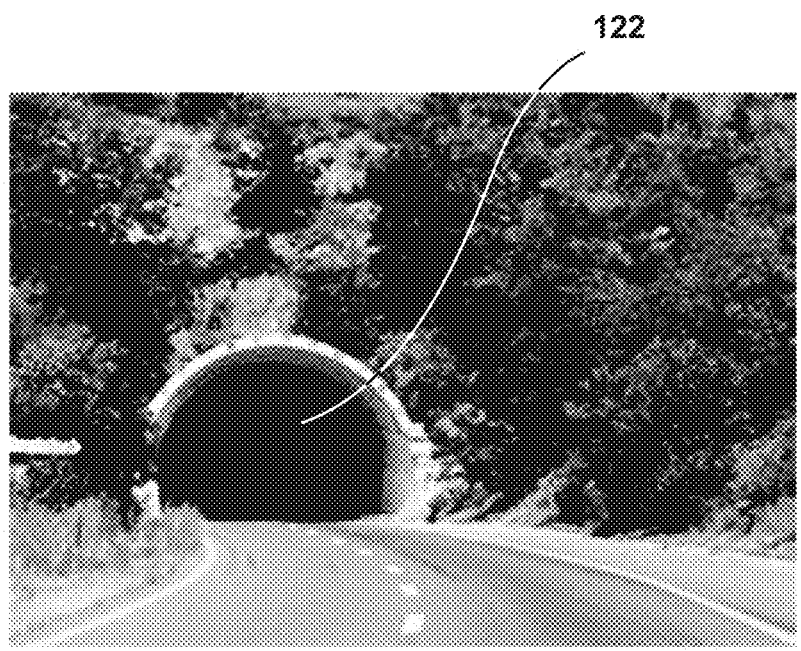
FIG. 6 is an image captured by an imaging device on a vehicle of a tunnel being approached by the vehicle.
Figure 7:
FIG. 7 is an image captured by an imaging device on a vehicle of trees on either lateral side of the vehicle.

Referring now to FIGS. 6 and 7, various examples of the management system 10 and associated processes S300, S400, S500 applied to the captured images 28 demonstrate enhanced control of the environmental control system 26. For example, the front imaging device 18 may capture an image of a tunnel 122 ahead of the vehicle 12 (FIG. 6). The management system 10 may provide for an active adjustment to the headlights 27 prior to the vehicle 12 entering the tunnel 122. For example, the image processor 94 may either correlate the image to other images 28 of tunnels 122 using trained models to detect the tunnel 122 or may otherwise determine, via pixel analysis, that a dark spot on the image is growing larger as more images 28 are sampled. Because the brightness levels may be decreasing as the vehicle 12 approaches the tunnel 122, the management system 10 may decrease or increase the sampling rate to detect that such brightness level changes are actually occurring and control the exterior lighting system 64 to energize the headlights 27. In another example, a pair of oncoming lights may be detected in the image captured by the front imaging device 18. In response, the control circuitry 38 may de-energize the high-beams of the headlights 27 without de-energizing the low-beams.

In reference to FIG. 7, the brightness conditions on one or both of the right and left sides 34, 36 may be detected by the management system 10 to allow for the localized control over the space in the cabin 40. In the example of FIG. 7, tall trees 124 are located on both sides 34, 36 of the vehicle 12, which causes the lux level of the right and left imaging devices 22, 24 to be lower than the front and rear imaging devices 18, 20. In this example, the control circuitry 38 may adjust any subsystem of the environmental control system 26 to cause the vehicle 12 to have consistent lighting and heating/cooling in the interior 16.

It is contemplated that, in any of the preceding examples, the location of the vehicle 12, the time of day, the temperature, the direction of travel, or any other factor related to conditions of the region external 14 to the vehicle 12 may be accessed by the control circuitry 38 to further enhance the brightness condition estimation. For example, the GPS may indicate the position of the vehicle 12 is in a region (e.g., the northern hemisphere) that has less sunlight than other regions. In other examples, the GPS may track the vehicle 12 along a travel route, which may be pre-defined by the user or predicted based on the location of the vehicle 12. Thus, the travel route may refer to an expected route for the vehicle 12 to travel. The time of day may further be used to track the location of the sun relative to the driving direction and path of the vehicle 12. In these examples, the control circuitry 38 adjusts the brightness threshold information, the brightness flag, and/or the spatial brightness model 120 to provide enhanced estimations that limit manual adjustments. By way of example, if the sun is determined to be overhead of the location of the vehicle 12 in FIG. 7 based on GPS information and time-of-day information, the lux values of the surrounding sides 34, 36 (e.g., the right and/or left sides 34, 36) may be immaterial to brightness estimation for purposes of activating the headlights 27. Conversely, if the sun is aligned with the right side 36 of the vehicle 12, the direction of light may be determined by the control circuitry 38. Accordingly, in this example, the control circuitry 38 may more heavily weigh the lux values of the front and rear imaging devices 18, 20. In this way, image processing to classify surroundings (e.g., the trees, buildings, mountains) may be combined with processing to determine light direction and magnitude.

In one example, data from one or more of the microphones 110 may be employed to detect rain (e.g., the sound of rainfall). In response to such detection, the control circuitry 38 may energize the headlights 27 by weighing the auxiliary sensor data from the microphone 110 very heavily. For example, in a neural network or another mechanism of the spatial brightness model 120, a neuron corresponding to audio data captured by the microphone 110 may be heavily weighted to cause the brightness estimation to exceed the threshold information and cause the headlights 27 to energize. In this way, the management system 10 and processes of the disclosure may provide for software techniques that enhance responsiveness of exterior lighting.

In general, the management system 10 may enhance brightness detection and response by using machine-learning and controlling sampling rates, among other mechanisms. The system 10 may increase response time and more accurately predict events to adjust lighting and/or climate.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:
1. A vehicle, comprising:
a compartment having a first space and a second space, the first space having a first environmental condition and the second space having a second environmental condition;
at least one camera that captures at least one first image of a first part of a region external to the vehicle and that captures at least one second image of a second part of the region external to the vehicle, wherein the first part of the region aligns with the first space and the second part of the region aligns with the second space;
an environmental control system of the vehicle having at least one of lighting control and climate control for the vehicle; and
control circuitry in communication with the at least one camera and the environmental control system, the control circuitry configured to:
determine a first brightness condition of the first part of the region based on the at least one first image;
determine a second brightness condition of the second part of the region based on the at least one second image; and control the environmental control system to adjust the first and the second environmental conditions based on the first and the second brightness conditions.

2. The vehicle of claim 1, wherein adjustment to the first environmental condition is independent of the adjustment to the second environmental condition.

3. The vehicle of claim 2, wherein the adjustments to the first and second environmental conditions are adjustments to a climate of the first and the second spaces, respectively.

4. The vehicle of claim 1, wherein the first and the second brightness conditions each include an angle of brightness and a brightness level.

5. The vehicle of claim 1, wherein the control circuitry is configured to:
process the first and the second brightness conditions in a spatial brightness model trained to determine a response for the environmental control system based on the first and second brightness conditions.

6. The vehicle of claim 5, wherein the at least one camera includes a first camera having a vehicle-forward orientation and a second camera having a different orientation than the vehicle-forward orientation, wherein the first camera captures the at least one first image and the second camera captures the at least one second image.

7. The vehicle of claim 6, wherein the control circuitry is configured to:
process a plurality of first images of the at least one first image captured sequentially by the first camera;
detect a cluster of dark pixels increasing in size across the plurality of first images captured sequentially; and
activate headlights of the vehicle in response to the increasing size of the cluster of dark pixels.

8. The vehicle of claim 6, wherein the spatial brightness model maps the brightness conditions to the first and second spaces.

9. The vehicle of claim 8, wherein the response includes an adjustment to at least one of interior lighting of the vehicle and climate control of the compartment.

10. The vehicle of claim 5, wherein the control circuitry is configured to:
train the spatial brightness model based on user feedback to previous responses by the environmental control system.

11. The vehicle of claim 5, further comprising:
headlights, and wherein the response is to control the headlights of the vehicle.

12. A vehicle, comprising:
a compartment having a first space and a second space, the first space having a first climate and the second space having a second climate;
at least one camera that captures images of a first part of a region external to the vehicle aligned with the first space and a second part of the region external to the vehicle aligned with the second space;
a climate control system; and
control circuitry in communication with the at least one camera and the climate control system, the control circuitry configured to:
determine a first brightness condition of the first part of the region based on the images;
determine a second brightness condition of the second part of the region based on the images;
control the climate control system to adjust the first climate based on the first and the second brightness conditions; and
control the climate control system to adjust the second climate based on the first and the second brightness conditions.

13. The vehicle of claim 12, wherein adjustment to the first climate is independent of the adjustment to the second climate.

14. The vehicle of claim 12, wherein the control circuitry is configured to:
process the first and second brightness conditions in a spatial brightness model trained to determine a response for the climate control system based on the first and the second brightness conditions.

15. The vehicle of claim 14, wherein the spatial brightness model maps the first and second brightness conditions to the first and the second spaces.

16. The vehicle of claim 14, wherein the control circuitry is configured to:
train the spatial brightness model based on user feedback to previous responses by the climate control system.

17. The vehicle of claim 14, further comprising:
a ventilation system, and wherein the response is to control the ventilation system.

18. A vehicle, comprising:
a compartment having a first space and a second space, the first space having a first climate and the second space having a second climate;
at least one camera that captures images of a first part of a region external to the vehicle aligned with the first space and a second part of the region external to the vehicle aligned with the second space;
a climate control system; and
control circuitry in communication with the at least one camera and the climate control system, the control circuitry configured to:
determine a first brightness condition of the first part of the region based on the images;
determine a second brightness condition of the second part of region based on the images;
process the first and the second brightness conditions in a spatial brightness model trained to determine a response for the climate control system based on the first and the second brightness conditions;
control the climate control system to adjust the first climate based on the response; and
control the climate control system to adjust the second climate based on the response.

19. The vehicle of claim 18, wherein adjustment to the first climate is independent of adjustment to the second climate.

20. The vehicle of claim 18, wherein the first and the second brightness conditions each include an angle of brightness and a brightness level.

* * * * *